United States Patent
Bennett

(10) Patent No.: US 6,484,577 B1
(45) Date of Patent: *Nov. 26, 2002

(54) ACCELEROMETER SIGNAL PROCESSOR COMPRISING VARIABLE OSCILLATORS AND COUNTERS

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,893

(22) Filed: Feb. 28, 2002

Related U.S. Application Data

(63) Continuation of application No. 10/004,433, filed on Oct. 31, 2001.

(51) Int. Cl.[7] .............................................. G01P 15/08
(52) U.S. Cl. ...................................... 73/514.26; 73/510
(58) Field of Search ...................... 73/510, 511, 514.16, 73/514.19, 514.26, 514.27, 1.41; 702/141, 145

(56) References Cited

U.S. PATENT DOCUMENTS

| | | | |
|---|---|---|---|
| 3,731,542 A | 5/1973 | Forsberg | |
| 3,766,787 A | 10/1973 | Irvine | |
| 3,789,674 A | 2/1974 | Anderson et al. | |
| 5,069,071 A | 12/1991 | McBrien et al. | |
| 5,233,873 A | 8/1993 | Mozgowied et al. | |
| 5,291,534 A | * 3/1994 | Sakurai et al. | 73/724 |
| 5,437,186 A | 8/1995 | Tschulena | |
| 5,591,910 A | 1/1997 | Lin | |
| 5,719,336 A | 2/1998 | Ando et al. | |
| 6,018,998 A | 2/2000 | Zunino et al. | |
| 6,082,196 A | * 7/2000 | Nonoyama et al. | 73/514.18 |
| 6,170,332 B1 | 1/2001 | MacDonald et al. | |

OTHER PUBLICATIONS

"Segmented Photo Diodes (SPOT Series)", UDT Sensors, Inc., No Date.
"Non–Contact Optical Positioning Sensing Using Silicon Photodetectors", UDT Sensors, Inc., Apr. 1982.

* cited by examiner

*Primary Examiner*—Helen Kwok
(74) *Attorney, Agent, or Firm*—Milad G. Shara, Esq.; Howard H. Sheerin, Esq.

(57) ABSTRACT

An accelerometer signal processor is disclosed comprising a sensor for generating A, B, C and D sensor signals in response to a sensor excitation. Variable oscillators convert the sensor signals into oscillating signals, and the oscillating signals up-count and down-count counters. The outputs of the counters represent a linear acceleration along at least two axes, as well as a rotational acceleration.

9 Claims, 11 Drawing Sheets

ACCELEROMTER AT REST

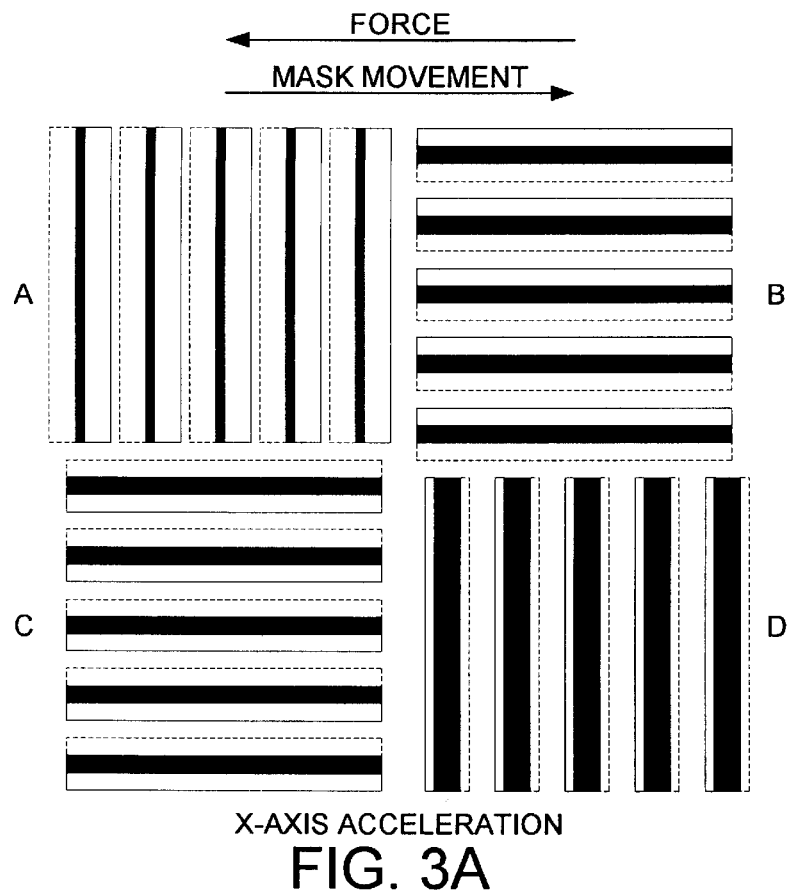
FIG. 3A — X-AXIS ACCELERATION
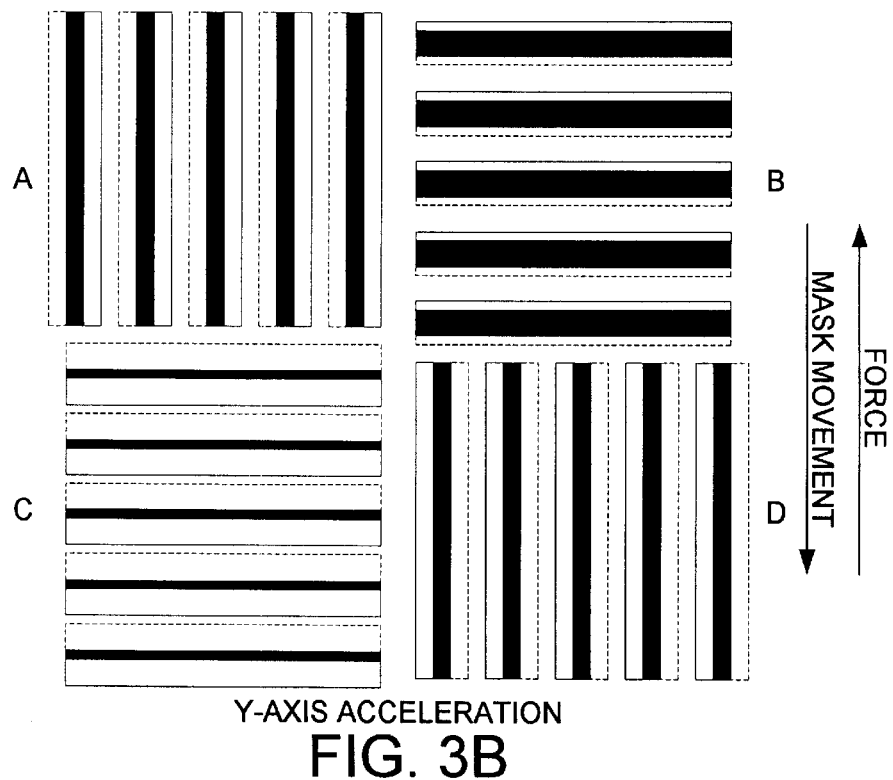
FIG. 3B — Y-AXIS ACCELERATION

ACCELEROMETER SIGNAL PROCESSOR COMPRISING VARIABLE OSCILLATORS AND COUNTERS

CROSS-REFERENCE TO RELATED APPLICATIONS

This application is a continuation of commonly owned patent application Ser. No. 10/004,433, filed Oct. 31, 2001, for MULTI-AXIS ACCELEROMETER COMPRISING A MASS SUSPENDED BY SPRIGS ABOVE AN OPTICAL SENSOR.

BACKGROUND OF THE INVENTION

1. Field of the Invention

The present invention relates to accelerometers. More particularly, the present invention relates to an accelerometer signal processor comprising variable oscillators and counters.

2. Description of the Prior Art

Accelerometers are employed in various applications to detect and compensate for disturbances, such as a shock or periodic vibration. An example is a disk drive which employs an accelerometer to detect disturbances affecting an actuator arm while attempting to maintain a head over a centerline of a track. The output of the accelerometer is used as a feed-forward compensation signal in a servo control system to effectively reject the disturbance.

Conventional accelerometers comprise a sensor for detecting accelerations, and signal processing circuitry for converting the sensor signals into acceleration signals representing a direction and magnitude of the detected accelerations. The acceleration signals are typically generated as digital signals for processing by other control circuitry, such as a servo controller in a disk drive. A conventional Analog-to-Digital converter (ADC) is typically employed to convert the analog sensor signals into digital sensor signals, and the digital sensor signals processed to generate the digital acceleration signals. However, a conventional ADC implemented with analog circuitry is relatively expensive due to its size and complexity.

There is, therefore, a need to reduce the cost of the signal processing circuitry used to convert the analog sensor signals of an accelerometer into digital acceleration signals representing a direction and magnitude of detected accelerations.

SUMMARY OF THE INVENTION

The present invention may be regarded as an accelerometer signal processor for use in processing sensor signals generated by an accelerometer. The accelerometer comprises a sensor for generating A, B, C and D sensor signals in response to a sensor excitation. The accelerometer signal processor comprises an A variable oscillator (VO) for generating an A oscillating signal in response to the A sensor signal, a B VO for generating a B oscillating signal in response to the B sensor signal, a C VO for generating a C oscillating signal in response to the C sensor signal, and a D VO for generating a D oscillating signal in response to the D sensor signal. A first axis counter comprising an up count input responsive to the A oscillating signal and a down count input responsive to the D oscillating signal generates on output signal indicative of an acceleration along a first axis. A second axis counter comprising an up count input responsive to the B oscillating signal and a down count input responsive to the C oscillating signal generates on output signal indicative of an acceleration along a second axis. A rotation counter comprising an up count input responsive to the A and D oscillating signals and a down count input responsive to the B and C oscillating signals generates an output signal indicative of a rotational acceleration.

In one embodiment, the accelerometer signal processor comprises a first summing circuit for summing frequencies of the A and D oscillating signals to generate an output signal applied to the up count input of the rotation counter, and a second summing circuit for summing frequencies of the B and C oscillating signals to generate an output signal applied to the down count input of the rotation counter.

In one embodiment, the sensor comprises an optical sensor and the sensor excitation comprises light. In one embodiment, the accelerometer comprises an AGC counter responsive to the A, B, C and D oscillating signals and a reference oscillating signal. The AGC counter for generating an AGC signal for controlling the sensor excitation.

The present invention may also be regarded as a method of processing sensor signals generated by an accelerometer comprising a sensor for generating A, B, C and D sensor signals in response to a sensor excitation signal. The method comprises the steps of generating an A oscillating signal in response to the A sensor signal, generating a B oscillating signal in response to the B sensor signal, generating a C oscillating signal in response to the C sensor signal, and generating a D oscillating signal in response to the D sensor signal. The method further comprises the step of up-counting a first-axis counter in response to the A oscillating signal and down-counting the first-axis counter in response to the D oscillating signal, the first axis counter for generating an output signal indicative of a first linear acceleration. The method further comprises the step of up-counting a second axis counter in response to the B oscillating signal and down-counting the second axis counter in response to the C oscillating signal, the second axis counter for generating on output signal indicative of a second linear acceleration. The method further comprises the step of up-counting a rotation counter in response to the A and D oscillating signals and down-counting the rotational counter in response to the B and C oscillating signals, the rotation counter for generating an output signal indicative of the rotational acceleration.

BRIEF DESCRIPTION OF THE DRAWINGS

FIGS. 3A and 3B illustrate how the optical sensor of FIG. 1 is illuminated when subjected to linear X-axis and Y-axis accelerations.

DESCRIPTION OF THE PREFERRED EMBODIMENTS

Figure 5:
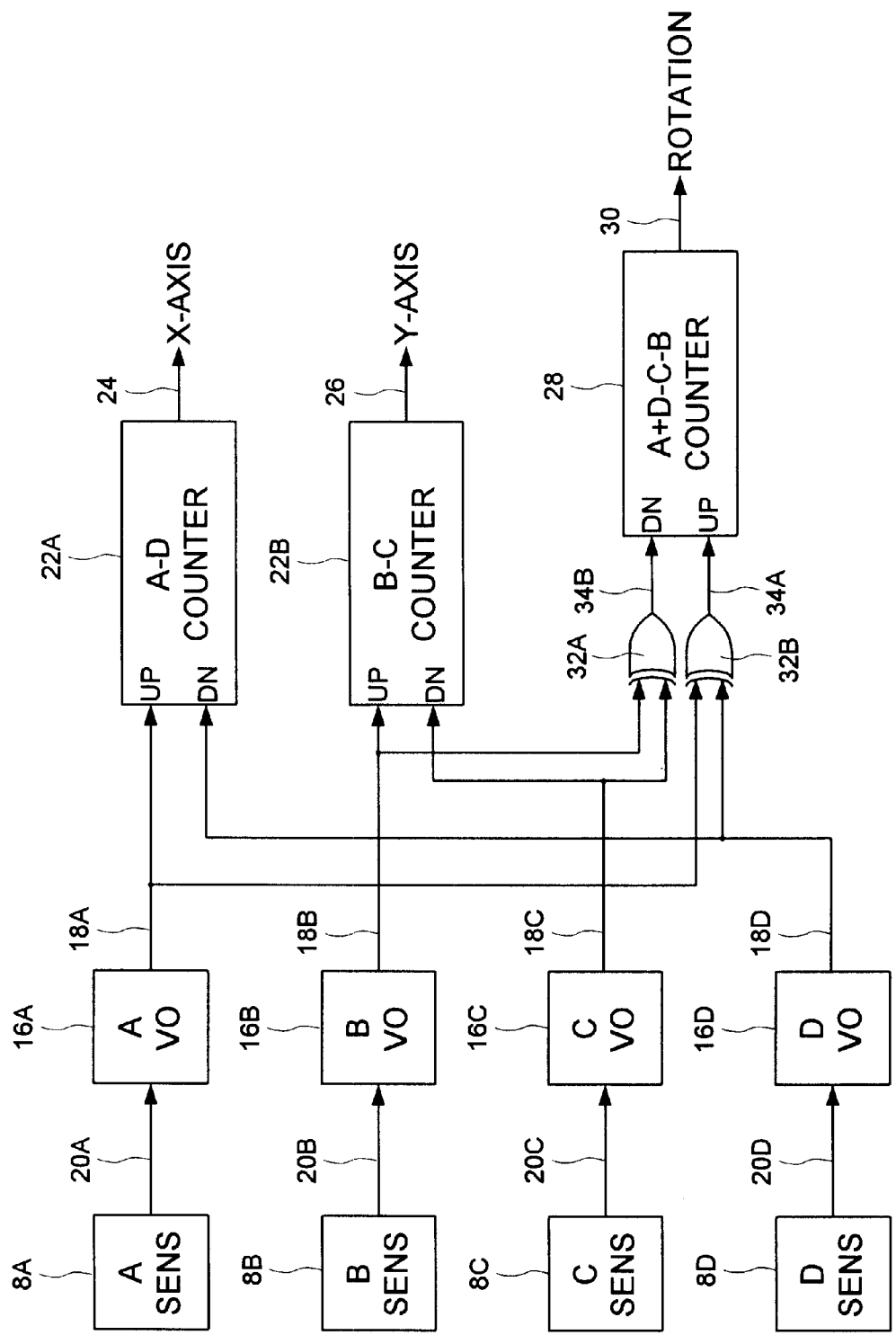
FIG. 5 shows a signal processor for processing the sensor signals generated by the optical sensor of FIG. 1 to generate the detected acceleration signals according to an embodiment of the present invention.

FIG. 5 shows an accelerometer signal processor implemented in CMOS circuitry for detecting acceleration signals according to an embodiment of the present invention. The accelerometer signal processor comprises an A variable oscillator (VO) 16A for generating an A oscillating signal 18A in response to an A sensor signal 20A, a B VO 16B for generating a B oscillating signal 18A in response to a B sensor signal 20B, a C VO 16C for generating a C oscillating signal 18C in response to a C sensor signal 20C, and a D VO 16D for generating a D oscillating signal 18D in response to a D sensor signal 20D. A first axis (e.g., X-axis) counter 22A comprising an up count input responsive to the A oscillating signal 18A and a down count input responsive to the D oscillating signal 18D, the first axis counter 22A generates on output signal 24 indicative of an acceleration along the first axis. A second axis (e.g., Y-axis) counter 22B comprising an up count input responsive to the B oscillating signal 18B and a down count input responsive to the C oscillating signal 18C, the second axis counter 22B generates an output signal 26 indicative of an acceleration along the second axis. A rotation counter 28 comprising an up count input responsive to the A and D oscillating signals (18A and 18D) and a down count input responsive to the B and C oscillating signals (18B and 18C), generates an output signal 30 indicative of a rotational acceleration.

The embodiment of FIG. 5 comprises a first summing circuit (XOR circuit 32A) for summing frequencies of the A and D oscillating signals (18A and 18D) to generate an output signal 34A applied to the up count input of the rotation counter 28, and a second summing circuit (XOR circuit 32B) for summing frequencies of the B and C oscillating signals (18B and 18C) to generate an output signal 34B applied to the down count input of the rotation counter 28.

In the embodiment of FIG. 5, the VOs (16A–16D) perform an analog-to-digital conversion of the sensor signals (20A–20D), wherein the frequency of the oscillating signals (18A–18D) represents the magnitude of their respective sensor signals (20A–20D). Over a selected number of sample periods, the count value of the first axis counter 22A represents the difference between the integrated output of the A and D sensors:

X-axis=$A-D$

This difference represents an acceleration along the X-axis. Similarly, the count value in the second axis counter 22B represents the difference between the integrated output of the B and C sensors:

Y-axis=$B-C$

This difference represents an acceleration along the Y-axis. Finally, the count value in the rotation counter 28 represents the difference between the integrated output of the A+D sensors and the integrated output of the B+C sensors:

Rotation=$A+D-C-B$

This difference represents a rotational acceleration. The sign of the detected acceleration signals represents the direction of movement (left or right, up or down, clockwise or counterclockwise).

Figure 6A:
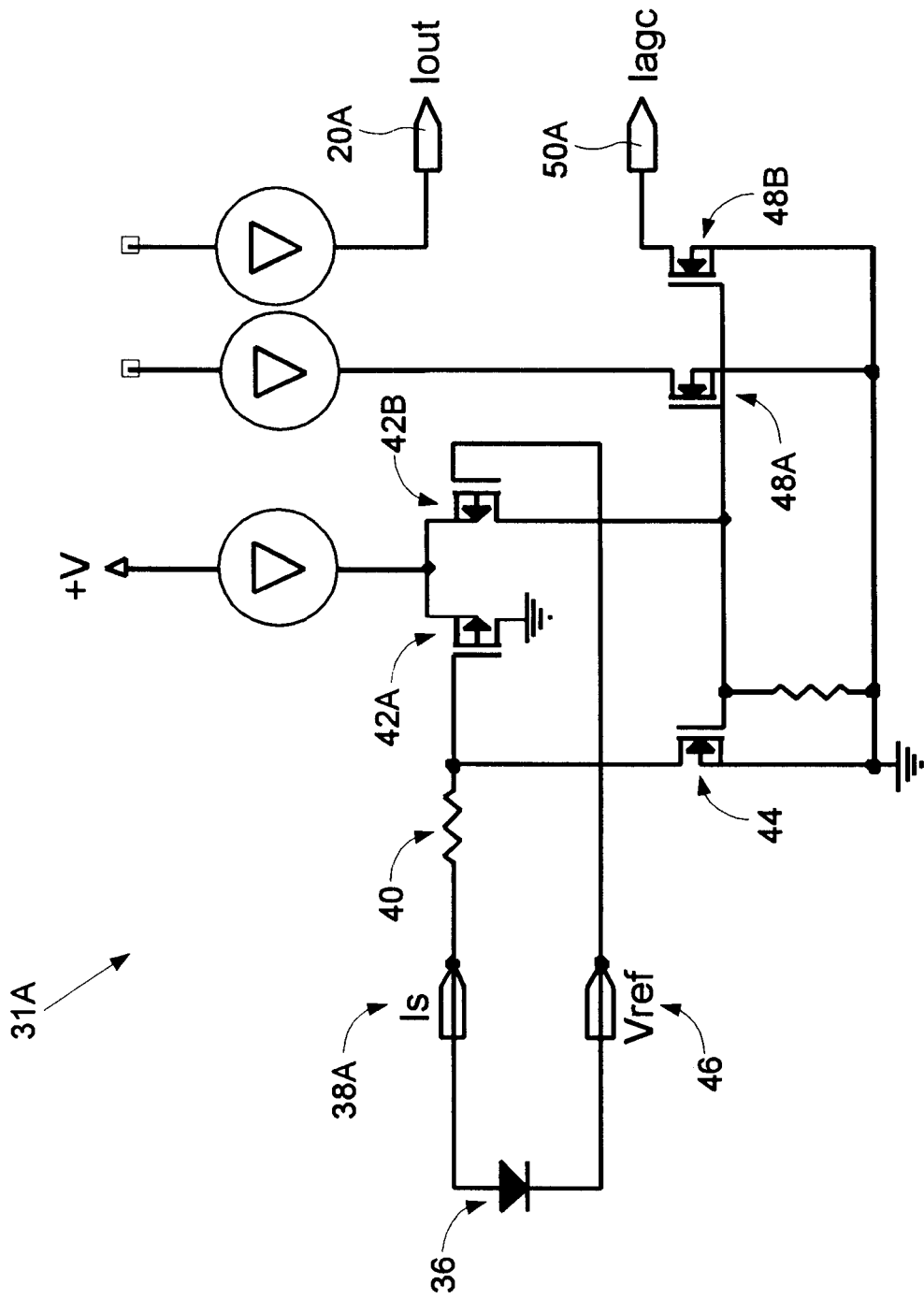
FIG. 6A shows an amplifier circuit for amplifying the signal output by the optical sensor of FIG. 1.

FIG. 6A shows an amplifier circuit 31A according to an embodiment of the present invention for amplifying the output of the A sensor 8A to generate sensor signal 20A. A similar amplifier circuit is used to generate the sensor signals 20C–20D. In this embodiment, the sensor comprises an optical sensor 4 (FIG. 1) including photo diodes 36 which are run in a shorted-junction configuration driving into a low impedance such that they operate like a current source generating a current signal Is 38A. Transistors 42A and 42B form a differential pair, which forces transistor 44 to supply whatever current is necessary to hold the gate of transistor 42A at an externally supplied reference voltage Vref 46. Resistor 40 serves as a noise limiter and isolates parasitic capacitances in the photodiode 36 from the differential pair 42A and 42B to control stability. When the photodiode 36 is illuminated with light 6, the resulting current is balanced in the drain of transistor 44 and mirrored in the drains of transistors 48A and 48B. One drain generates an output Iagc 50A for use in an automatic gain control circuit as described below with reference to FIG. 6B, and the other drain generates the sensor signal Iout 20A.

Figure 6B:
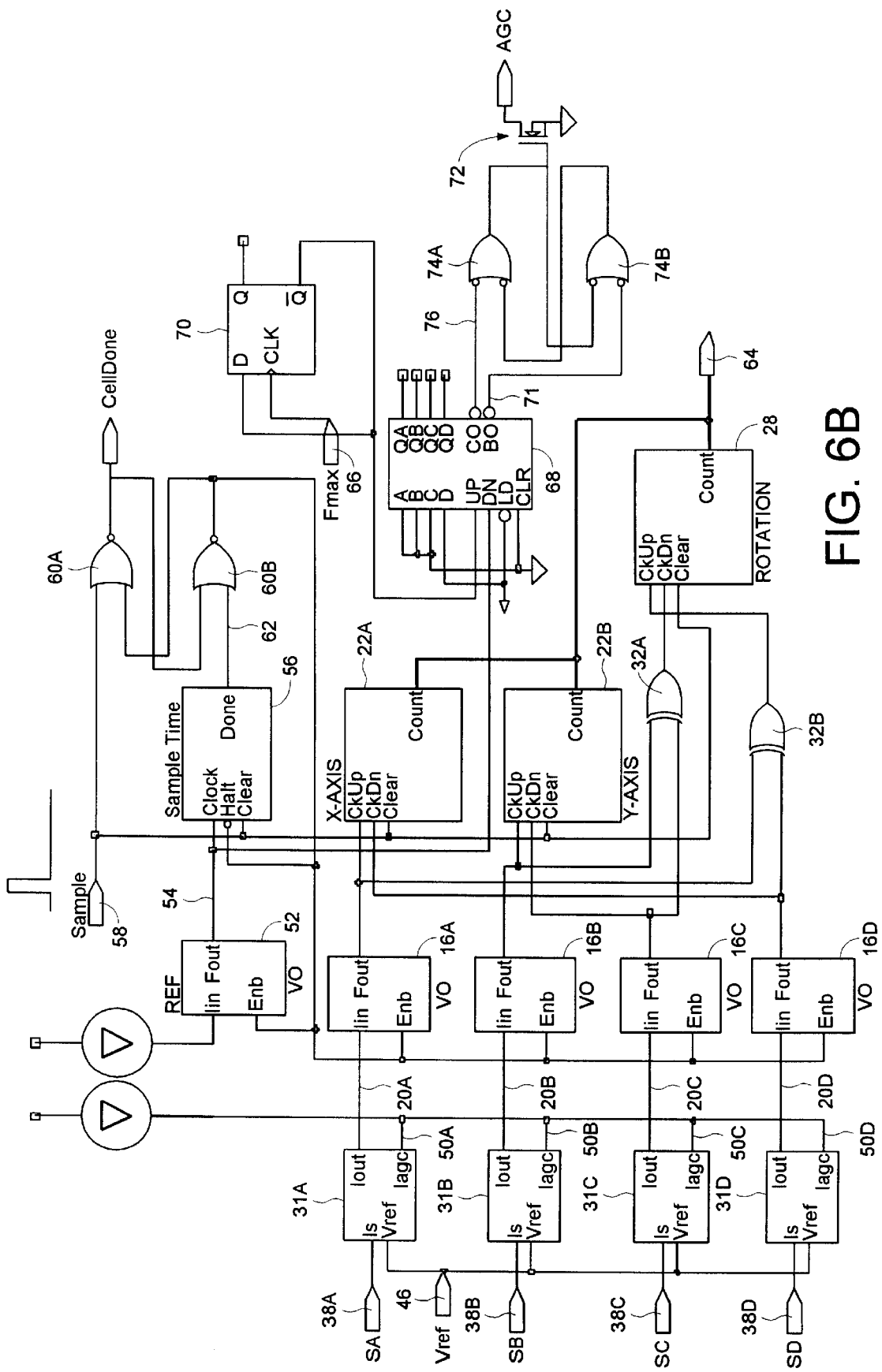
FIG. 6B shows further details for the circuitry of FIG. 5 using the amplifier circuit of FIG. 6A according to an embodiment of the present invention.

FIG. 6B shows further details of the circuitry of FIG. 5 according to an embodiment of the present invention. In this embodiment, the Iagc currents (50A–50D) output by the sensor signal amplifiers (31 A–31D) are summed and the resulting summed signal is mirrored as an input signal to a reference VO 52. The oscillating signal 54 output by the reference VO 52 drives the clock input of a sample time counter 56. The sample time counter 56 determines the integration interval for the sensor signals (20A–20D), and a sample input signal 58 initiates the integration interval by clearing counters 56, 22A, 22B and 28, and by enabling the VOs 52 and 16A–16D through NOR gates 60A and 60B. At the end of the integration interval, the output 62 of the sample time counter 56 disables the VOs 52 and 16A–16D through NOR gates 60A and 60B, and the contents of the counters 22A, 22B and 28 are extracted via bus 64.

The embodiment of FIG. 6B also comprises an automatic gain control circuit (AGC) which maintains the parameters of the signal processor within predetermined bounds, including operation of the optical sensor 4, linearity of the VOs, as well as to compensate for aging, drift and nonlinearities in the light source. The AGC operates by controlling the light source (e.g., a light emitting diode) so as to constrain the frequency of oscillating signal 54 approximate to the frequency of externally supplied reference signal Fmax 66. The oscillating signal 54 is applied to the down input signal of counter 68, and the reference signal Fmax 66 is applied to the up input signal of counter 68 (divided by two through D register 70). If the frequency of the oscillating signal 54 is too high, then the BO output 71 of counter 68 will disable the light source by turning off transistor 72 through OR gates 74A and 74B. With the light source disabled, the sum of the Iagc currents 50A–50D will decrease causing the frequency of the oscillating signal 54 to decrease. When the frequency of the oscillating signal 54 decreases below the threshold determined by Fmax 66, the CO output 76 of counter 68 will enable the lights source by turning on transistor 72 through OR gates 74A and 74B. The result is a hysteretic on/off duty cycle that cycles the LED on and off as necessary to maintain the conversion frequency within reasonable limits. The capacitance of the sensors acts as an integrator and stores enough charge so that the average output frequency of the VO circuits 50A–50D is fairly constant.

Figure 6C:
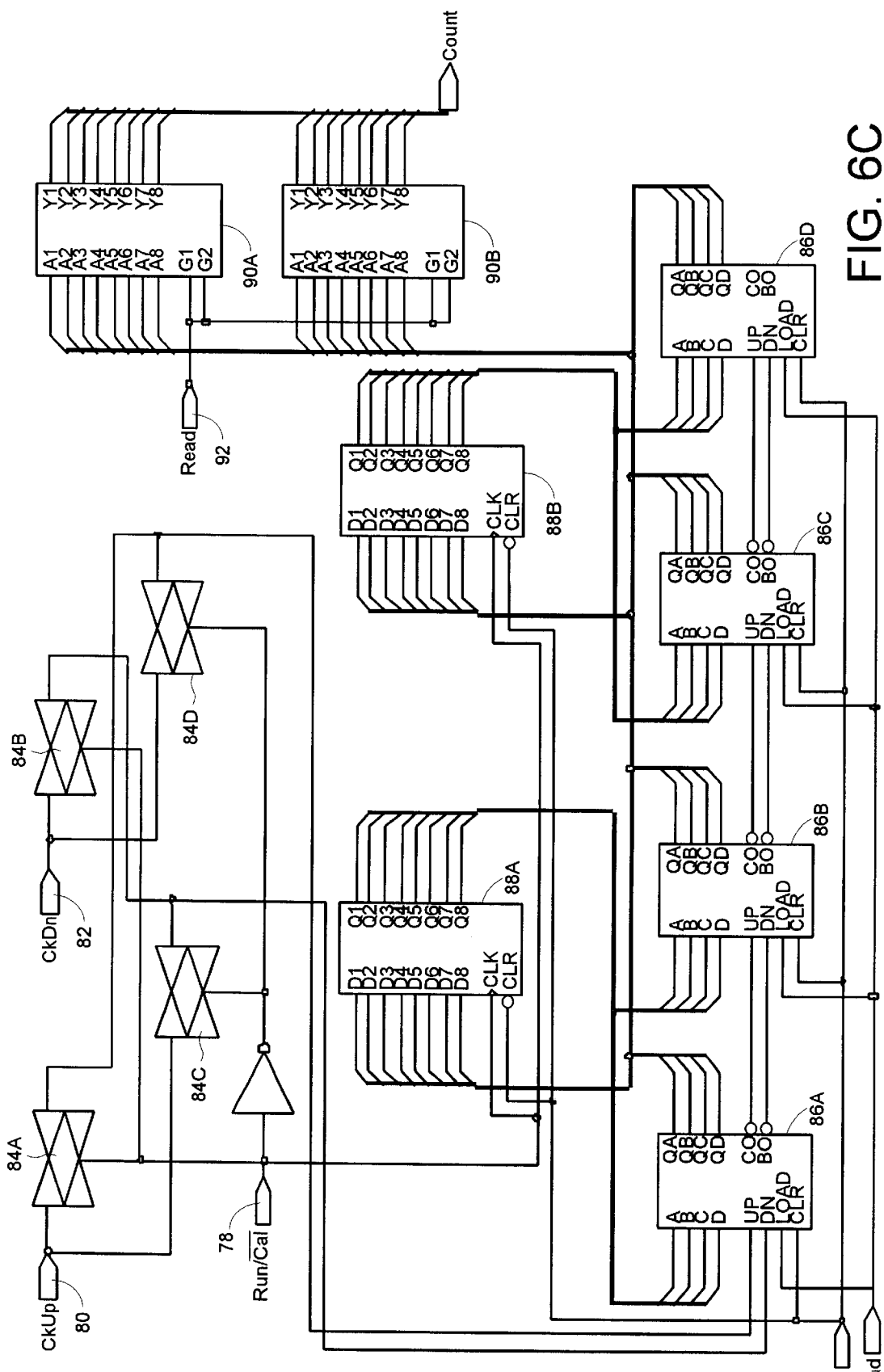
FIG. 6C shows further details of one of the counter circuits shown in FIG. 6B, including the circuitry for calibrating the counter circuit to account for offsets in the optical sensor and other circuitry.

In one embodiment, the counters 22A, 22B and 28 are periodically calibrated to compensate for offsets in the optical sensor 4 due to drift, aging, and other changes in the circuitry. FIG. 6 shows further details for one of the counters 22A, 22B and 28 for carrying out the calibration according to an embodiment of the present invention. The counter comprises a Run/Cal input signal 78 for reversing the up and down input signals 80 and 82 during a calibration session by controlling switches 84A–84D. To start the calibration, the counters 22A, 22B and 28 are cleared and the light source is disabled. A brief pause in counting is made to allow the optical sensor current to drop to its dark current level. The sample time counter 56 is then enabled for the integration interval and the counters 22A, 22B and 28 count up to an offset value that corresponds to all circuit offsets. This offset value is then loaded from cascaded counters 86A–86D into preload registers 88A and 88B. During normal operation, the counters 22A, 22B and 28 are preloaded with the values stored in registers 88A and 88B, thereby correcting for dark current and circuit offsets. The output of the counter is read through buffer registers 90A and 90B when a Read signal 92 is asserted. It may be desirable to run the calibration at some larger fraction of the normal current, due to nonlinearities in the VO circuitry.

Figure 1:
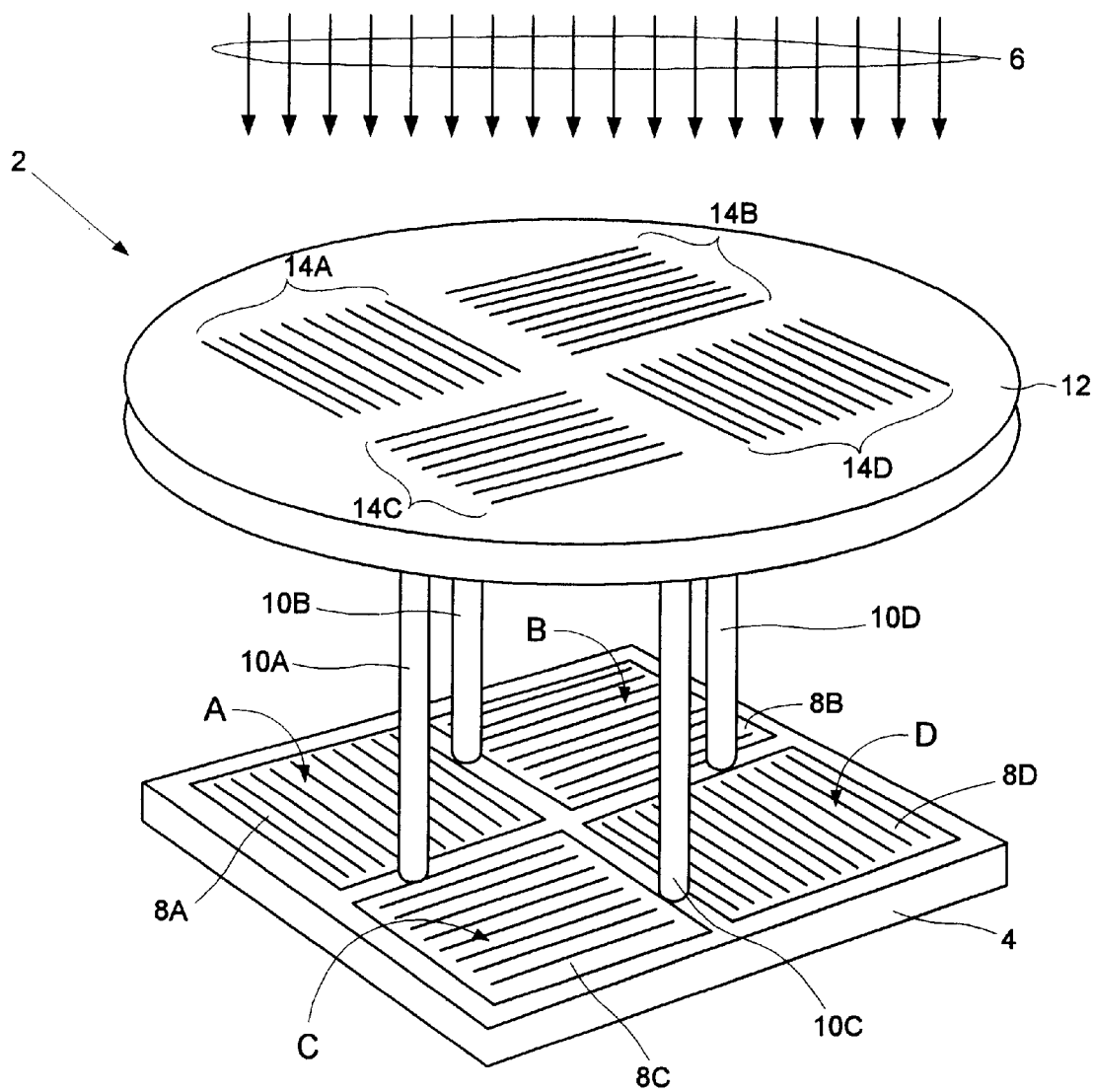
FIG. 1 shows a multi-axis accelerometer according to an embodiment of the present invention comprising a mass suspended above a sensor by a plurality of springs.

FIG. 1 shows a suitable multi-axis accelerometer 2 for generating the sensor signals processed by the accelerometer signal processor of FIG. 5. The multi-axis accelerometer comprises at least one optical sensor 4 for generating a sensor signal in response to light 6 illuminating the optical sensor 4, a mask (8A–8D) positioned over the optical sensor 4 for covering a first area of the optical sensor 4, at least one spring (10A–10D), and a mass 12 suspended above the optical sensor 4 by the spring (10A–10D). The mass 12 comprises at least one mass aperture (14A–14D) for allowing the light 6 to pass through the mass aperture (14A–14D) and illuminate a second area of the optical sensor 4 not covered by the mask (8A–8D). When the multi-axis accelerometer 2 accelerates causing the mass 12 to move, a corresponding movement of the mass aperture (14A–14D) alters the illumination of the optical sensor 4 such that the sensor signal is indicative of the acceleration.

Any suitable optical sensor may be employed in the multi-axis accelerometer, including a charged couple device (CCD) or a photodiode. The SPOT Series segmented photodiode manufactured by UTD Sensors, Inc. in Hawthorne, Calif. is a suitable optical sensor for use in the embodiments of the present invention In the embodiment of FIG. 1, the optical sensor 4 and mask (8A–8D) are integrally formed. The at least one mass aperture comprises a plurality of linear apertures (14A–14D), and the mask comprises a corresponding plurality of opaque lines (8A–8D) formed on the surface of the optical sensor 4. Also in this embodiment, the at least one spring comprises a plurality of vertical wires (10A–10D) each having a first end connected to the mass 12 and a second end connected to the optical sensor 4. The length of the vertical wires (10A–10D) determines the shadow effect of the optical sensor 4 as well as the spring constant of the spring. The diameter of the vertical wires (10A–10D) also affects the spring constant as well as the vertical support. The diameter of the vertical wires should be selected to provide sufficient vertical support for the mass while providing sufficient sensitivity. As described below, in one embodiment the accelerometer comprises a housing to provide a compartment between the optical sensor 4 and the mass 12. The compartment is filled with a fluid, such as oil, to provide a damping effect.

The optical sensor 4 in the embodiment of FIG. 1 comprises an A sensor, a B sensor, a C sensor and a D sensor. The A sensor generates the A sensor signal 20A, the B sensor generates the B sensor signal 20B, the C sensor generates the C sensor signal 20C, and the D sensor generates the D sensor signal 20D. A first linear acceleration is detected relative to the A sensor signal 20A and the D sensor signal 20D, a second linear acceleration is detected relative to the B sensor signal 20B and the C sensor signal 20C, and a rotational acceleration is detected relative to the A, B, C and D sensor signals (20A–20D).

Figure 2:
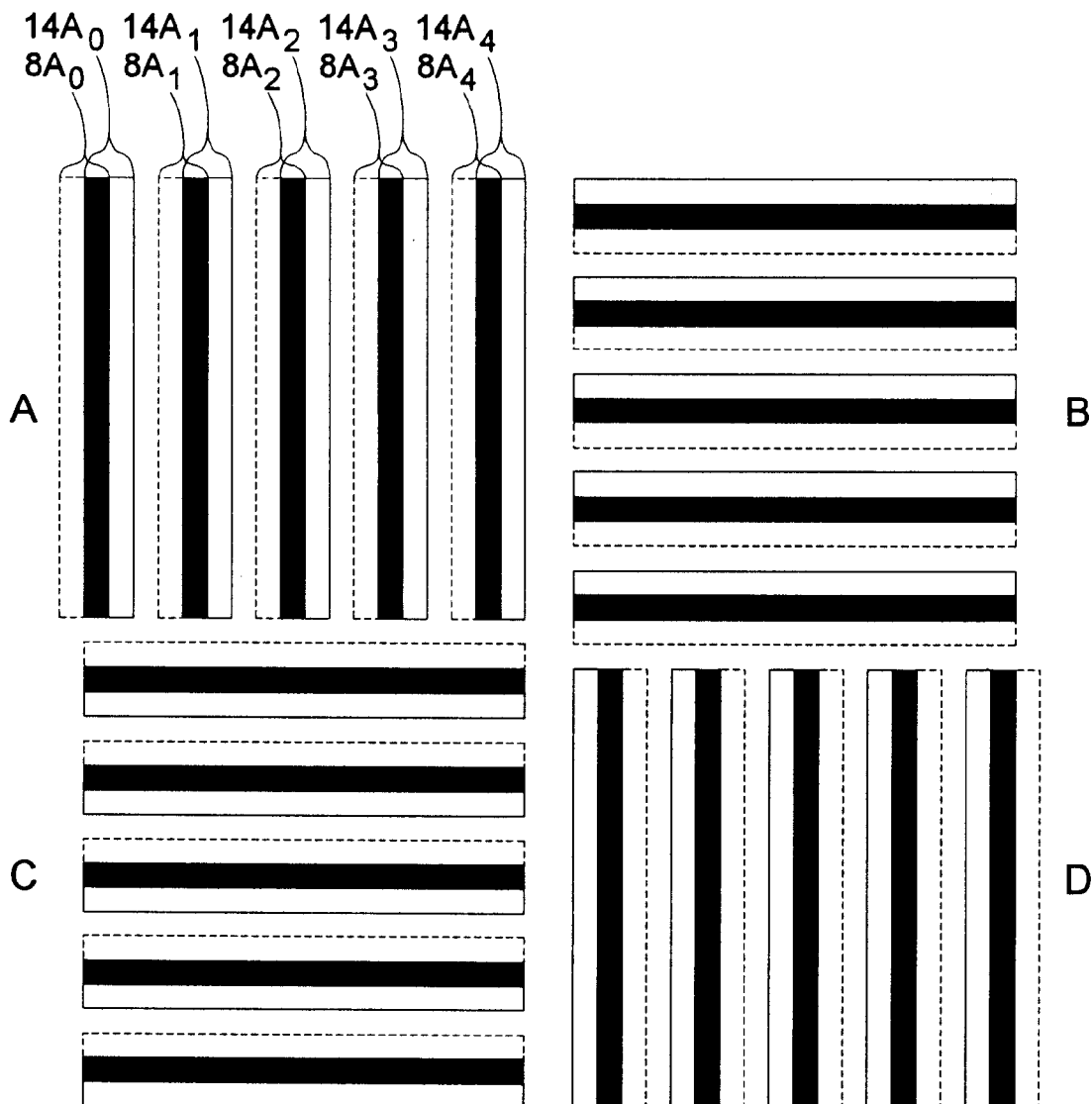
FIG. 2 illustrates how the optical sensor of FIG. 1 is illuminated when in the steady state.

The operation of the multi-axis accelerometer in detecting acceleration is understood with reference to FIG. 2, FIGS. 3A–3B and FIGS. 4A–4B. FIG. 2 shows the multi-axis accelerometer at rest, that is, not subjected to any acceleration. The opaque lines (e.g., lines $8A_0$–$8A_4$) forming the mask are offset from the linear mass apertures (e.g. mass apertures $14A_0$–$14A_4$) such that half of the light passing through the mass apertures illuminates the optical sensor 4. FIG. 3A shows how the illumination of the optical sensor 4 changes when the multi-axis accelerometer 2 is subjected to an X-axis acceleration. The force in this example is to the left, such that the mass 12 moves toward the right with respect to the optical sensor 4. The light illuminating the A quadrants increases and that illuminating the D sensor decreases, while the light illuminating the B and C quadrants remains unchanged. If the acceleration is in the reverse direction, the light illuminating the A quadrant decreases and that illuminating the D sensor increases. When the acceleration is along the Y-axis in the upward direction as shown in FIG. 3B, the mass 12 moves down with respect to the optical sensor 4. The light illuminating the C quadrants increases and that illuminating the B sensor decreases, while the light illuminating the A and D quadrants remains unchanged. If the acceleration is in the reverse direction, the light illuminating the C quadrant decreases and that illuminating the B sensor increases.

Figure 4A:
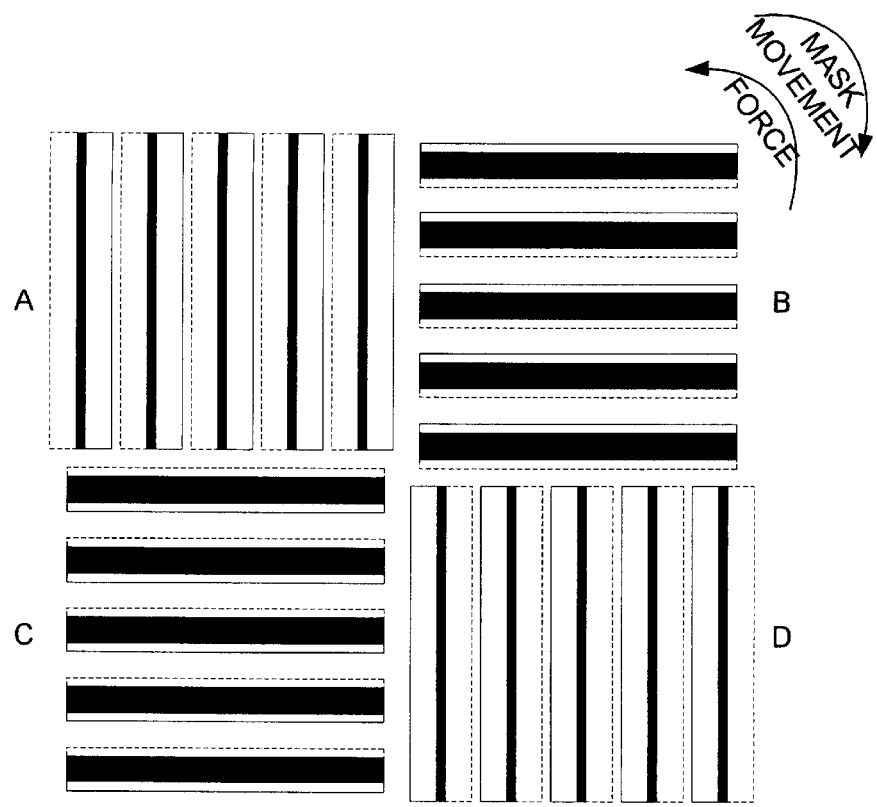
FIGS. 4A and 4B illustrate how the optical sensor of FIG. 1 is illuminated when subjected to rotational accelerations.
Figure 4B:
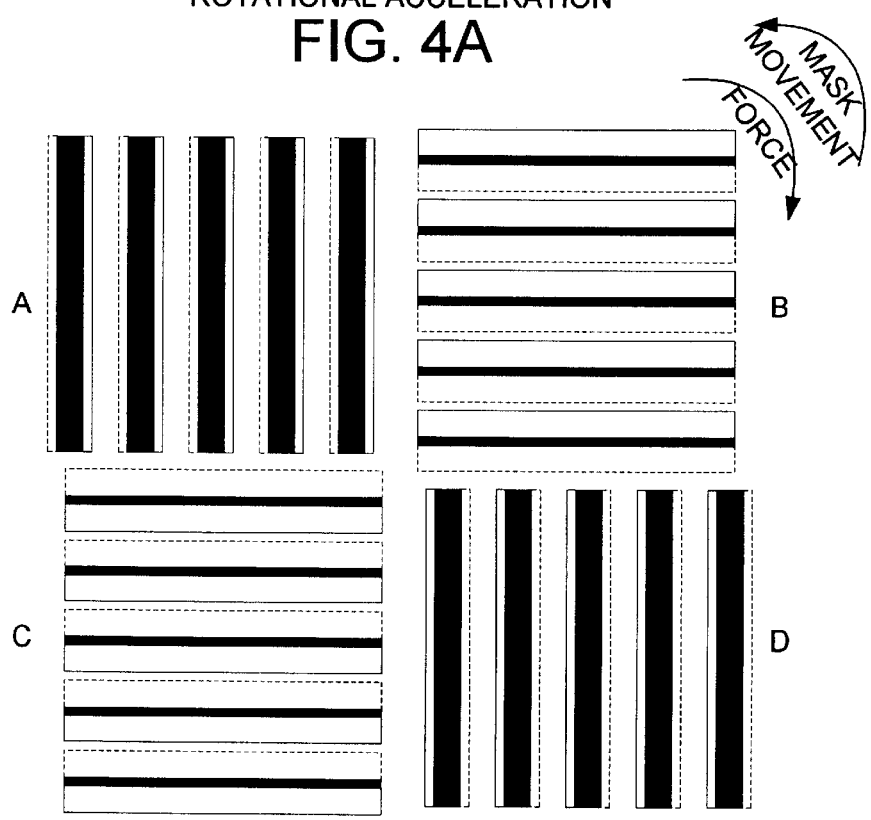

Referring now to FIG. 4A, when the multi-axis accelerometer 2 is subject to a rotational acceleration in the counter-clockwise direction, the mass 12 rotates in a clockwise direction with respect to the optical sensor 4. The light illuminating the A and D quadrants increases, while the light illuminating the B and C quadrants decreases. If the acceleration is in the clockwise direction such that the mass 12 moves in the counter-clockwise direction as shown in FIG. 4B, then the light illuminating the B and C quadrants increases, while the light illuminating the A and D quadrants decreases.

Therefore in the embodiment of FIG. 1, an acceleration along the X-axis is detected relative to the A and D sensor signals, an acceleration in along the Y-axis is detected relative to the B and C sensor signals, and a rotational acceleration is detected relative to the A, B, C and D sensor signals. In one embodiment, the X-axis acceleration is detected by computing a difference between the A and D sensor signals, and the Y-axis acceleration is detected by computing a difference between the B and C sensor signals. The rotational acceleration is detected by computing a first sum generated by summing the A and D sensor signals, a second sum generated by summing the B and C sensor signals, and by computing a difference between the first sum and the second sum.

Any suitable multi-axis accelerometer which generates A, B, C, and D sensor signals may be employed in the embodiments of the present invention. For example, a suitable capacitive or inductive multi-axis accelerometer which generates A, B, C, and D sensor signals may be employed.

Figure 7:
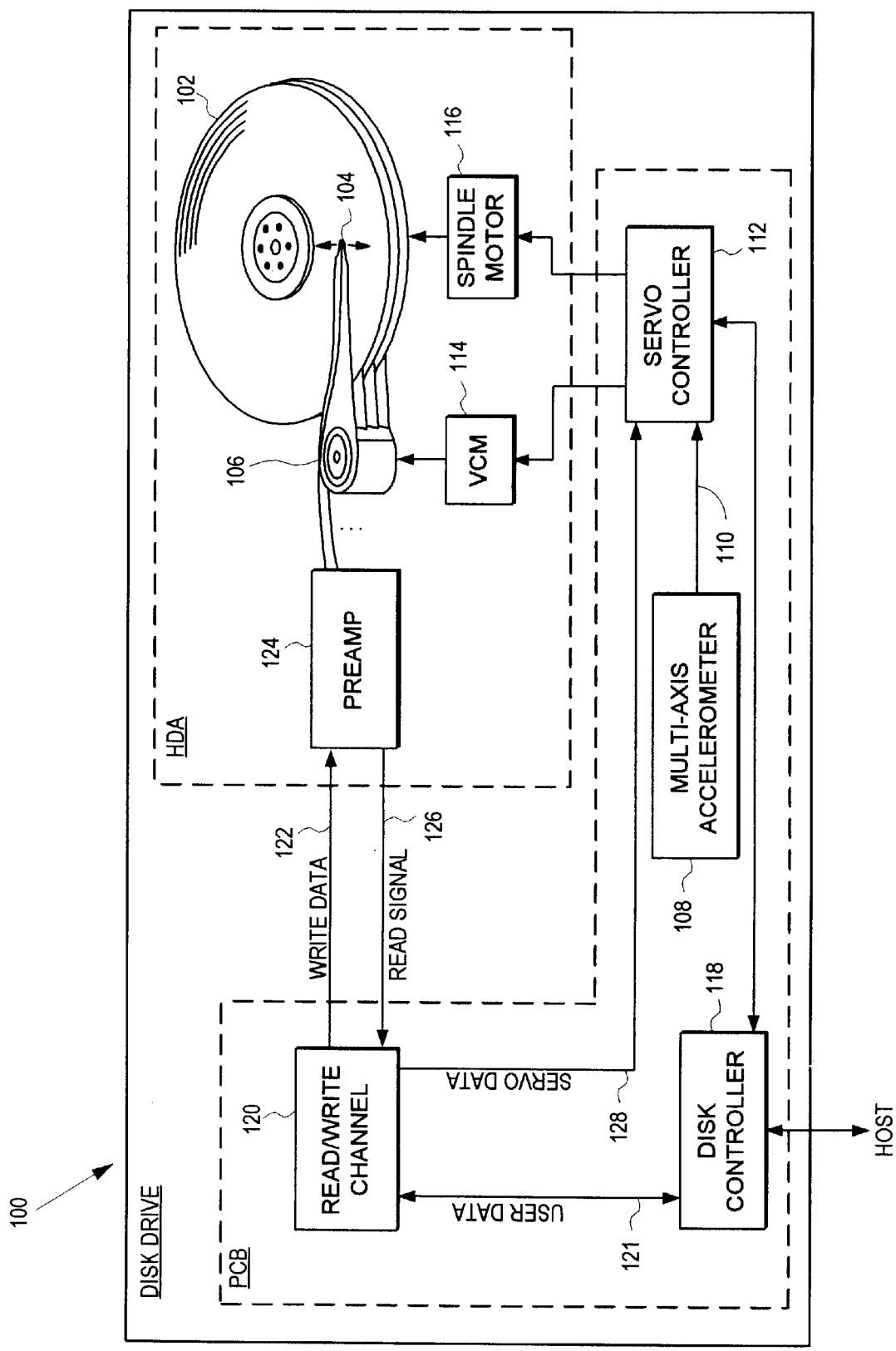
FIG. 7 shows a disk drive comprising a multi-axis accelerometer according to another embodiment of the present invention.

FIG. 7 shows a disk drive 100 according to an embodiment of the present invention. The disk drive 100 comprises a disk 102, a head 104, an actuator 106 for actuating the head 104 radially over the disk 102, and a multi-axis accelerometer 108 for generating an acceleration signal 110 representing a vibration affecting the actuator, the acceleration signal 110 for controlling operation of the disk drive 100. The multi-axis accelerometer 108 comprises a mass suspended by springs above an optical sensor (e.g., FIG. 1) and signal processing circuitry for processing the sensor signals to generate the acceleration signal 110 (e.g., FIG. 5).

In the embodiment of FIG. 7, a servo controller 112 processes the acceleration signal 110 to generate appropriate control signals applied to a voice coil motor (VCM) 114. The servo controller 112 processes the acceleration signal 110 as a feed-forward signal in a servo control loop for controlling the motion of the actuator 106 through the VCM 114. The disk drive 100 of FIG. 7 further comprises a spindle motor 116 for rotating the disk 102 and a disk controller 118 for communicating with a host system. The disk controller 118 provides user data received from the host to a read/write channel 120 over line 121. The read/write channel 120 encodes the user data to generate write data 122 written to the disk 102 via a preamp 124. During a read operation, the preamp amplifies the signal from the head 104 to generate a read signal 126 supplied to the read/write channel 120. The read write channel 120 comprises suitable circuitry for demodulating the read signal 126 into the recorded user data which is transmitted over line 121 to the disk controller 118 and ultimately to the host. The read/write channel 120 also demodulates embedded servo data 128 for use by the servo controller 112 in maintaining proper centerline tracking during read and write operations. A disturbance, such as a shock or periodic vibration, causing a linear or rotational acceleration of the disk drive 100 is detected by the multi-axis accelerometer 108 and substantially rejected by the servo controller 112 in response to the acceleration signal 110.

If a large enough shock causes the disk drive 100 to accelerate faster than the servo controller 112 can respond, other measures may be taken to prevent damage to the disk drive 100. In one embodiment, the disk drive 100 disables the write current if a large shock is detected while writing data to the disk 102 during a write operation. In another embodiment, when a large shock is detected the disk drive 100 parks the head 104 to ameliorate damage due to the head 102 "slapping" the surface of the disk 104. The head 104 may be parked on a ramp, or on a landing zone of the disk 102. When parked on a landing zone, the disk 104 is spun down so that the head 104 "sticks" to the surface of the disk 102.

Figure 8A:
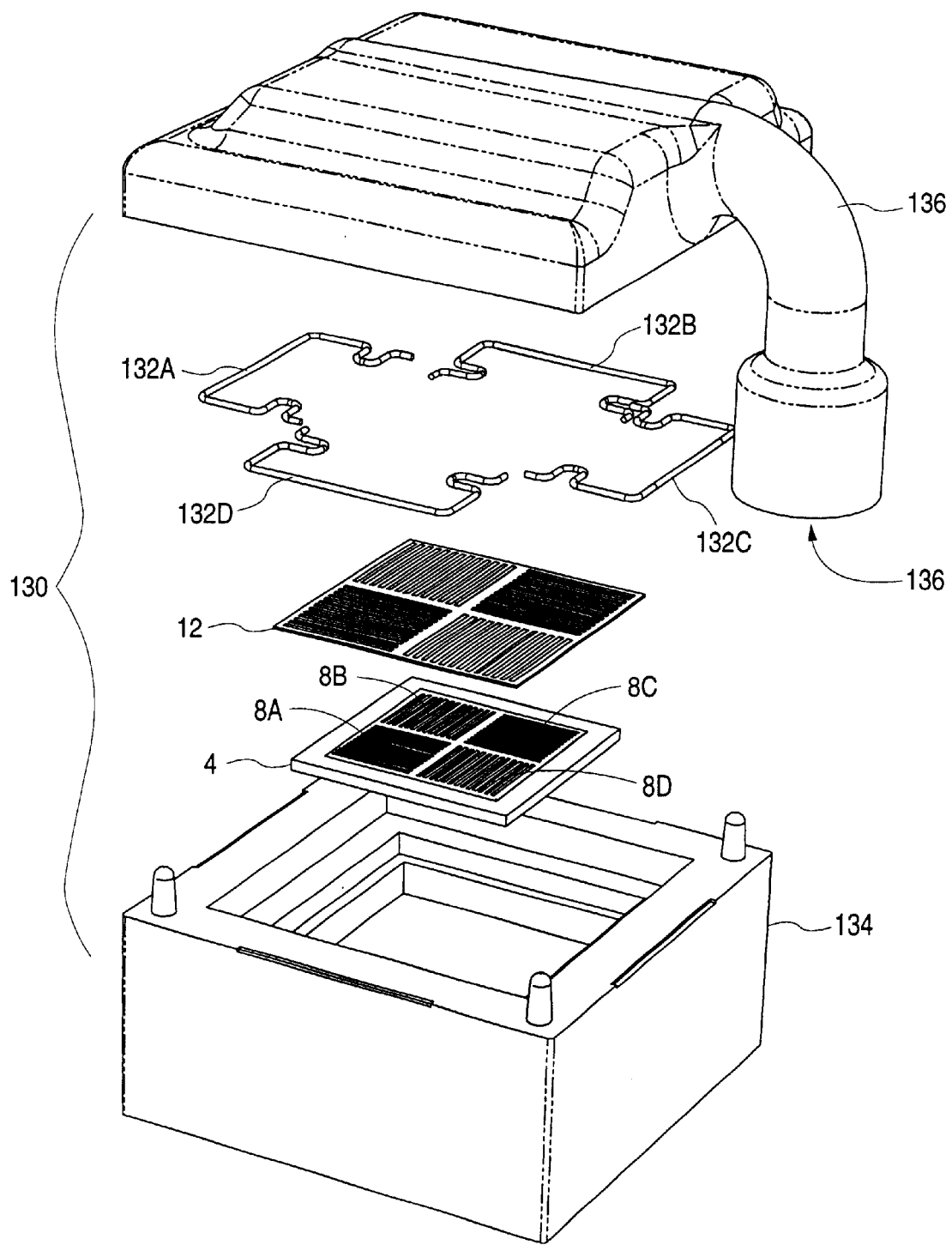
FIG. 8A shows an exploded view of a multi-axis accelerometer according to an embodiment of the present invention wherein the optical sensor and mass are enclosed in a housing to form a compartment that is filled with a fluid such as oil to provide a damping effect.

FIG. 8A shows an exploded view of a multi-axis accelerometer according to an embodiment of the present invention wherein the optical sensor 4 and mass 12 are enclosed in a housing 130. In this embodiment the mask (8A–8D) is formed integrally with the optical sensor 4. The mass 12 is suspended above the optical sensor 4 by a spring formed from horizontal wires (132A–132D) having a first end connected to the mass 12 and a second end connected to a base 134 of the housing 130. The housing 130 comprises a receptacle 136 for receiving the light source (e.g., an LED) and a channel 136 for directing the light over the mass 12.

Figure 8B:
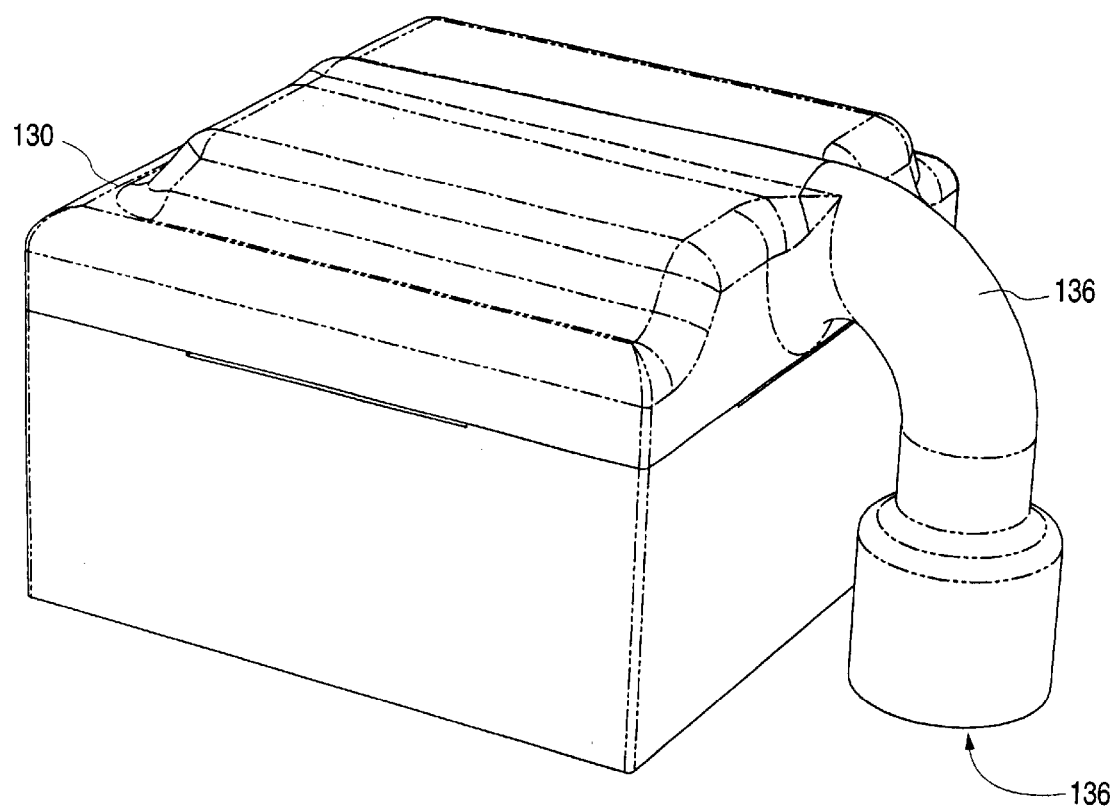
FIG. 8B shows an assembled view of the multi-axis accelerometer of FIG. 8A.

The compartment formed by the housing 130 between the mass 12 and optical sensor 4 is filled with a fluid (e.g., oil) to provide a damping effect. FIG. 8B shows an assembled view of the multi-axis accelerometer of FIG. 8A.

I claim:

1. An accelerometer signal processor for use in processing sensor signals generated by an accelerometer, the accelerometer comprises a sensor for generating A, B, C and D sensor signals in response to a sensor excitation, the accelerometer signal processor comprising:

(a) an A variable oscillator (VO) for generating an A oscillating signal in response to the A sensor signal;

(b) a B VO for generating a B oscillating signal in response to the B sensor signal;

(c) a C VO for generating a C oscillating signal in response to the C sensor signal;

(d) a D VO for generating a D oscillating signal in response to the D sensor signal;

(e) a first axis counter comprising an up count input responsive to the A oscillating signal and a down count input responsive to the D oscillating signal, the first axis counter for generating on output signal indicative of an acceleration along a first axis;

(f) a second axis counter comprising an up count input responsive to the B oscillating signal and a down count input responsive to the C oscillating signal, the second axis counter for generating on output signal indicative of an acceleration along a second axis; and (g) a rotation counter comprising an up count input responsive to the A and D oscillating signals and a down count input responsive to the B and C oscillating signals, the rotation counter for generating an output signal indicative of a rotational acceleration.

2. The accelerometer signal processor as recited in claim 1, further comprising:

(a) a first summing circuit for summing frequencies of the A and D oscillating signals to generate an output signal applied to the up count input of the rotation counter; and (b) a second summing circuit for summing frequencies of the B and C oscillating signals to generate an output signal applied to the down count input of the rotation counter.

3. The accelerometer signal processor as recited in claim 1, wherein:

(a) the sensor comprises an optical sensor; and (b) the sensor excitation comprises light.

4. The accelerometer signal processor as recited in claim 1, further comprising an AGC counter responsive to the A, B, C and D oscillating signals and a reference oscillating signal, the AGC counter for generating an AGC signal for controlling the sensor excitation.

5. The accelerometer signal processor as recited in claim 4, further comprising a reference VO for generating the reference oscillating signal.

6. A method of processing sensor signals generated by an accelerometer, the accelerometer comprises a sensor for generating A, B, C and D sensor signals in response to a sensor excitation, the method comprising the steps of:

(a) generating an A oscillating signal in response to the A sensor signal;

(b) generating a B oscillating signal in response to the B sensor signal, (c) generating a C oscillating signal in response to the C sensor signal;

(d) generating a D oscillating signal in response to the D sensor signal;

(e) up-counting a first-axis counter in response to the A oscillating signal and down-counting the first-axis counter in response to the D oscillating signal, the first axis counter for generating on output signal indicative of a first linear acceleration;

(f) up-counting a second axis counter in response to the B oscillating signal and down-counting the second axis counter in response to the C oscillating signal, the second axis counter for generating on output signal indicative of a second linear acceleration; and (g) up-counting a rotation counter in response to the A and D oscillating signals and down-counting the rotational counter in response to the B and C oscillating signals, a rotation counter for generating an output signal indicative of the rotational acceleration.

7. The method as recited in claim 6, further comprising the steps of:

(a) summing frequencies of the A and D oscillating signals to generate an output signal for up-counting the rotation counter; and (b) summing frequencies of the B and C oscillating signals to generate an output signal for down-counting the rotation counter.

8. The method as recited in claim 6, wherein:

(a) the sensor comprises an optical sensor; and (b) the sensor excitation comprises light.

9. The method as recited in claim 6, further comprising the steps of:

(a) generating a reference oscillating signal;

(b) generating a control signal in response to the A, B, C and D oscillating signals and the reference oscillating signal; and (c) controlling the sensor excitation in response to the control signal.

\* \* \* \* \*